US008159901B2

(12) United States Patent
Novick

(10) Patent No.: US 8,159,901 B2
(45) Date of Patent: Apr. 17, 2012

(54) SYSTEM AND METHOD FOR DISCRIMINATING A SUBSURFACE TARGET IN THE WATER FROM A SURFACE TARGET IN THE WATER

(75) Inventor: Arnold W. Novick, Providence, RI (US)

(73) Assignee: Raytheon Company, Waltham, MA (US)

( * ) Notice: Subject to any disclaimer, the term of this patent is extended or adjusted under 35 U.S.C. 154(b) by 245 days.

(21) Appl. No.: 12/628,483

(22) Filed: Dec. 1, 2009

(65) Prior Publication Data

US 2011/0128820 A1    Jun. 2, 2011

(51) Int. Cl.
G01S 3/80    (2006.01)
(52) U.S. Cl. ........................................................ 367/118
(58) Field of Classification Search ................... 367/118
See application file for complete search history.

(56) References Cited

U.S. PATENT DOCUMENTS

| | | | | |
|---|---|---|---|---|
| 4,003,015 | A * | 1/1977 | Pipkin | 367/105 |
| 4,225,954 | A * | 9/1980 | Medwin | 367/118 |
| 5,099,455 | A | 3/1992 | Parra | |
| 6,160,758 | A * | 12/2000 | Spiesberger | 367/125 |
| 6,400,647 | B1 * | 6/2002 | Huntress | 367/136 |
| 7,315,488 | B2 | 1/2008 | Novick et al. | |
| 7,738,319 | B2 | 6/2010 | Novick | |
| 7,773,458 | B2 | 8/2010 | Novick et al. | |
| 2006/0133211 | A1 * | 6/2006 | Yang | 367/154 |
| 2009/0257312 | A1 | 10/2009 | Novick et al. | |

FOREIGN PATENT DOCUMENTS

| | | |
|---|---|---|
| WO | WO 2007/145761 A2 | 12/2007 |
| WO | WO 2008/109242 A1 | 9/2008 |
| WO | WO 2008/112445 A1 | 9/2008 |
| WO | WO 2009/114578 A1 | 9/2009 |

OTHER PUBLICATIONS

PCT Search Report and Written Opinion of the ISA for PCT/US2010/055602 dated Feb. 22, 2011.
Zielinski et al., "Acoustic Positioning Using Multielement Array", Oceans '89 Proceedings, vol. 4, Sep. 1989, pp. 1111-1114.

* cited by examiner

*Primary Examiner* — Thomas Tarcza
*Assistant Examiner* — James Hulka
(74) *Attorney, Agent, or Firm* — Daly, Crowley, Mofford & Durkee, LLP

(57) ABSTRACT

A computer-implemented method of discriminating a surface from a subsurface sound-generating target in the water includes identifying an arrival angle of sound generated by the sound-generating target and received by a sound receiver at a known depth in the water. The method also includes generating a probability density function about the measured arrival angle having a corresponding plurality sound arrival angles and mapping the probability density function about the measured arrival angle to a probability density function of vertex depths. The method also includes calculating a probability that the depth of the sound-generating target is greater than a threshold depth by integrating the probability density function of vertex depth. A computer readable storage medium has instructions for implementing the above method and a system has modules for implementing the above method.

20 Claims, 6 Drawing Sheets

SYSTEM AND METHOD FOR DISCRIMINATING A SUBSURFACE TARGET IN THE WATER FROM A SURFACE TARGET IN THE WATER

FIELD OF THE INVENTION

This invention relates generally to acoustic methods and systems and, more particularly, to methods and systems that provide a discrimination of a subsurface sound generator, e.g., a submarine, from a surface sound generator, e.g., a surface ship.

BACKGROUND OF THE INVENTION

It is known that an underwater vessel (i.e., a submarine) generates sound, which is generally referred to as passive sound, as it travels through the water. The passive sound is generated by a variety of sources, including, but not limited to, sound generated by a submarine propulsion system, sound generated by a submarine propeller, and sound generated by a submarine electrical power generator. It is known that submarine designers attempt to reduce these and other passive sound sources in order to make a submarine difficult to detect by passive acoustic means, therefore remaining as covert as possible.

Some anti-submarine warfare (ASW) sonar systems attempt to detect the passive underwater sound generated by an enemy submarine. Some other ASW sonar systems attempt to both detect the passive sound and also to localize and/or track the enemy submarine. Localization is used to identify a position of the enemy submarine in azimuth, and/or in range, and/or in depth.

Passive ASW sonar systems attempt to detect, localize, and/or track the enemy submarine using the received passive sound only. The passive sonar system can remain covert and undetectable by the enemy submarine. Some known passive sonar systems use beamforming techniques to generate receive beams. The receive beams can be steered azimuthally to detect, localize, and/or track the enemy submarine in azimuth. The receive beam can also be steered to vertical angles.

Even at relatively short ranges, localization in depth and range is not generally possible when receiving only passive sound and depending upon a pointing direction of receive beams (directed up or down). This is because for any receive beam and associated vertical beam that points toward an enemy submarine, the enemy submarine can be positioned at an essentially infinite number of depths and ranges along the vertical beam steer angle.

At longer ranges, localization of the enemy submarine in range and depth is made even more difficult by a variety of factors, including but not limited to, a tendency of the passive sound generated by the enemy submarine to bend (i.e., refract), primarily in a vertical direction, as the sound propagates through the water. Therefore, the vertical angle at which the greatest amount of sound arrives at the sonar system, which is related to a particular receive vertical beam angle, does not necessarily point in the direction of the enemy submarine. Therefore, other techniques must be used to localize the target in range and in depth.

Narrowband, or matched field processing, is a known technique used to localize in range and in depth. However, narrowband processing requires a large sonar array, which is not practical for many applications. Narrowband processing also suffers from the affects of the above-described sound refraction.

Broadband autocorrelation processing is a known technique in which a signal received by a sonar element (i.e., sonar transducer), or a sonar array, is autocorrelated to identify a relative time delay between the passive sound arriving at the sonar element on a direct sound path and the passive sound arriving at the sonar element on a surface-reflected sound path. The relative time delay can be used to calculate range and depth. However, the performance of this technique can be greatly degraded at moderate to high sea states (i.e., when the sea surface has high waves), due to scattering of the sound reflected from the surface, which causes the autocorrelation to degrade.

Though an actual range and depth localization of a sound-generating target is desirable, it is also desirable just to be able to discriminate a subsurface target, e.g., a submarine, from a surface target, e.g., a ship.

SUMMARY OF THE INVENTION

The present invention provides an ability to discriminate a sub-surface sound-generating target, e.g., a submarine in the water, from a surface sound-generating target, e.g., a surface ship in the water.

In accordance with one aspect of the present invention, a computer-implemented method of discriminating a subsurface from a surface sound-generating target in the water includes identifying an arrival angle of sound generated by the sound-generating target and received by a sound receiver at a known depth in the water. The method also includes generating a probability density function about the measured arrival angle having a corresponding plurality sound arrival angles and mapping the probability density function about the measured arrival angle to a probability density function of vertex depths. The method also includes calculating a probability that the depth of the sound-generating target is greater than a threshold depth by integrating the probability density function of vertex depth.

In accordance with another aspect of the present invention, a computer-readable storage medium having computer readable code thereon for discriminating a subsurface from a surface sound-generating target in the water includes instructions for identifying an arrival angle of sound generated by the sound-generating target and received by a sound receiver at a known depth in the water. The computer-readable storage medium also includes instructions for generating a probability density function about the measured arrival angle having a corresponding plurality sound arrival angles and instructions for mapping the probability density function about the measured arrival angle to a probability density function of vertex depths. The computer-readable storage medium also includes instructions for calculating a probability that the depth of the sound-generating target is greater than a threshold depth by integrating the probability density function of vertex depth.

In accordance with another aspect of the present invention, a system for discriminating a a subsurface from a surface sound-generating target in the water includes a sound receiver configured to receive underwater sound generated by an underwater target and configured to convert the underwater sound to a sound-related signal. The system also includes an acoustic processing module coupled to receive the sound related signal and configured to generate a processed signal. The system also includes an angle estimation module coupled to receive the processed signal and configured to identify an arrival angle of sound generated by the sound-generating target. The system also includes an arrival angle probability density function module coupled to receive the identified arrival angle and configured to generate a probability density function about the measured arrival angle having a corresponding plurality of sound arrival angles and a depth probability density function module configured to map the probability density function about the measured arrival angle to a probability density function of vertex depths. The system also includes a depth probability module configured to calculate a probability that the depth of the sound-generating target is greater than a threshold depth by integrating the probability density function of vertex depths.

BRIEF DESCRIPTION OF THE DRAWINGS

The foregoing features of the invention, as well as the invention itself may be more fully understood from the following detailed description of the drawings, in which:

FIG. 2A is a flow chart showing greater detail of a portion of the process of FIG. 2;

DETAILED DESCRIPTION OF THE INVENTION

Figure 1:
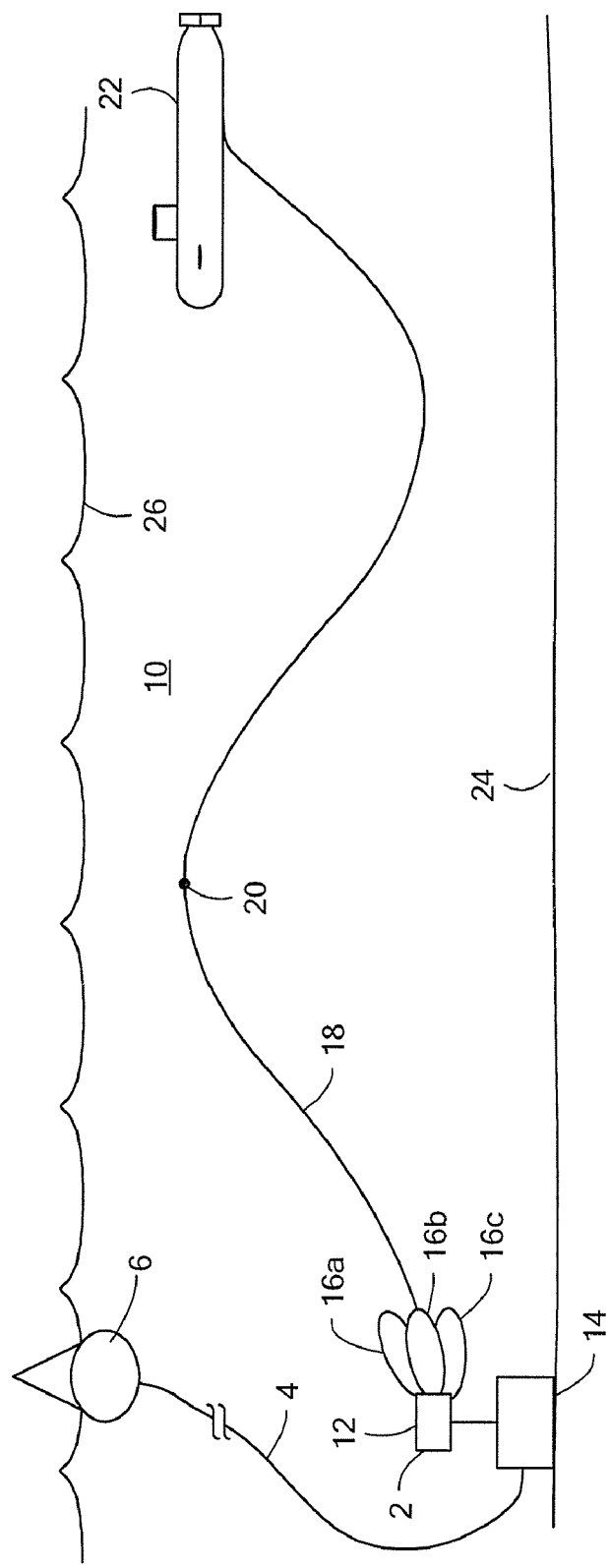
FIG. 1 is a pictorial showing a submarine, a sound receiving system having a sound receiver, and a sound path from the submarine to the sound receiver.

Before describing the method and system for target depth discrimination, some introductory concepts and terminology are explained. As used herein, the term "passive sound" is used to described sound generated by an object, which is not generated in order to provide an acoustic function. For example, a submarine, when traveling through the water, generates passive sound from a propulsion system, from a propeller, from an electrical power plant, and from flow-induced vibrations. The passive sound can have a variety of spectral characteristics, both narrowband and broadband, which are representative of the type of target (e.g., surface ship, submarine, etc.)

As used herein, the term "active sound" is used to describe sound that is intentionally generated by an object in order to provide an acoustic function. For example, the submarine can transmit active sound into the water with an active sonar system in order to receive return echoes from objects in or in contact with the water.

Systems and methods described herein apply both to sound generators in the water emitting either active sound, or passive sound, or both.

It is known that both passive and active sound can travel through the water in so-called "propagation paths," which can be non-straight paths, particularly when the propagation paths extend over appreciable distances, e.g., miles. The propagation paths can be modeled with propagation models. Some propagation models assume that the sound travels in straight propagation paths. These models are often referred to as isovelocity models, since they presume that sound travels at the same sound speed at all water depths. Other propagation models do not assume that the sound travels in straight propagation paths. These models, which are sometimes referred to as "ray trace" models, can be used to more accurately predict the sound propagation paths and the resulting sound that arrives at a point in the ocean, for example, at a sonar system that receives passive sound from an underwater target. Other propagation models accomplish the equivalent function but are less computationally convenient.

As is also known, sound that travels underwater can often take more than one propagation path. For example, sound can take a "direct propagation path" from a sound source to a sound receiver, which path may curve but not intercept the surface or bottom of the ocean. The sounds can also travel upward from the sound source, on a so-called "surface reflected path," reflecting (or scattering) from the surface of the water and traveling downward to the sound receiver. The sound can also travel downward from the sound source, on a so-called "bottom reflected path," reflecting (or scattering) from the bottom of the water basin and traveling upward to the sound receiver. The sound can also take a variety of other propagation paths, having, for example, both a surface and a bottom reflection (or scattering) or more than one surface and bottom reflection (or scattering).

Through there exist a very large number of sound propagation paths between s sound source and a sound receiver, some of the propagation paths are dominant, i.e., sound received at a sound receiver will have an intensity largely from the dominant sound paths. In particular, because sound tends to lose intensity each time it reflects or scatters from the surface or the bottom, the propagation paths having the strongest sound intensity when received at a sound receiver tend to be the direct path, the surface reflected path, and the bottom reflected path. However, a surface to bottom reflected path and a bottom to surface reflected path can also be considered as well as paths with multiple boundary contacts.

Referring to FIG. 1, an exemplary scenario includes a sound receiving system 2 at a known depth in the ocean 10. The sound receiving system 2 can include a sound receiver 12 coupled to an electronics assembly 14. In some embodiments, the sound receiver 12 can be a vertical line array of sound receiving elements arranged so at to be able to form receive acoustic beams, e.g., 16a-16c, each oriented to a different vertical angle relative to horizontal. In other embodiments, the sound receiver 12 can include any arrangement of sound receiving elements arranged so at to be able to form receive acoustic beams, e.g., 16a-16c, each oriented to a different vertical angle relative to horizontal. While the beams 16a-16b are shown to be directional in two dimensions for clarity, it will be appreciated that the beams 16a-16b may be representative of a portion of corresponding beams that are only directional in elevation, and not directional or less directional in azimuth around the sound receiver 12.

The electronics assembly 14 can be coupled to a surface float 6 with a wire 4 or fiber optic link. In some embodiments the surface float 6 includes a radio frequency (RF) transmitter configured to transmit acoustic data to a surface ship or the like.

An underwater target, here in the form of a submarine 22 generates passive sound that travels from the submarine 22 to the sound receiver 12 on a sound path 18. The sound path 18 is a direct sound path, having reflected from neither the surface 26 nor the bottom 24 of the ocean 10.

The sound path 18 has a vertex 20 at its shallowest depth. As described below in conjunction with subsequent figures, it will be understood that by knowing a vertical arrival angle of the passive sound arriving at the sound receiver 12, it is possible to discriminate a a subsurface from a surface position of a sound-generating target in the water. In other words, it is possible to identify if the sound-generating target is a submarine or a surface ship.

Figure 2:
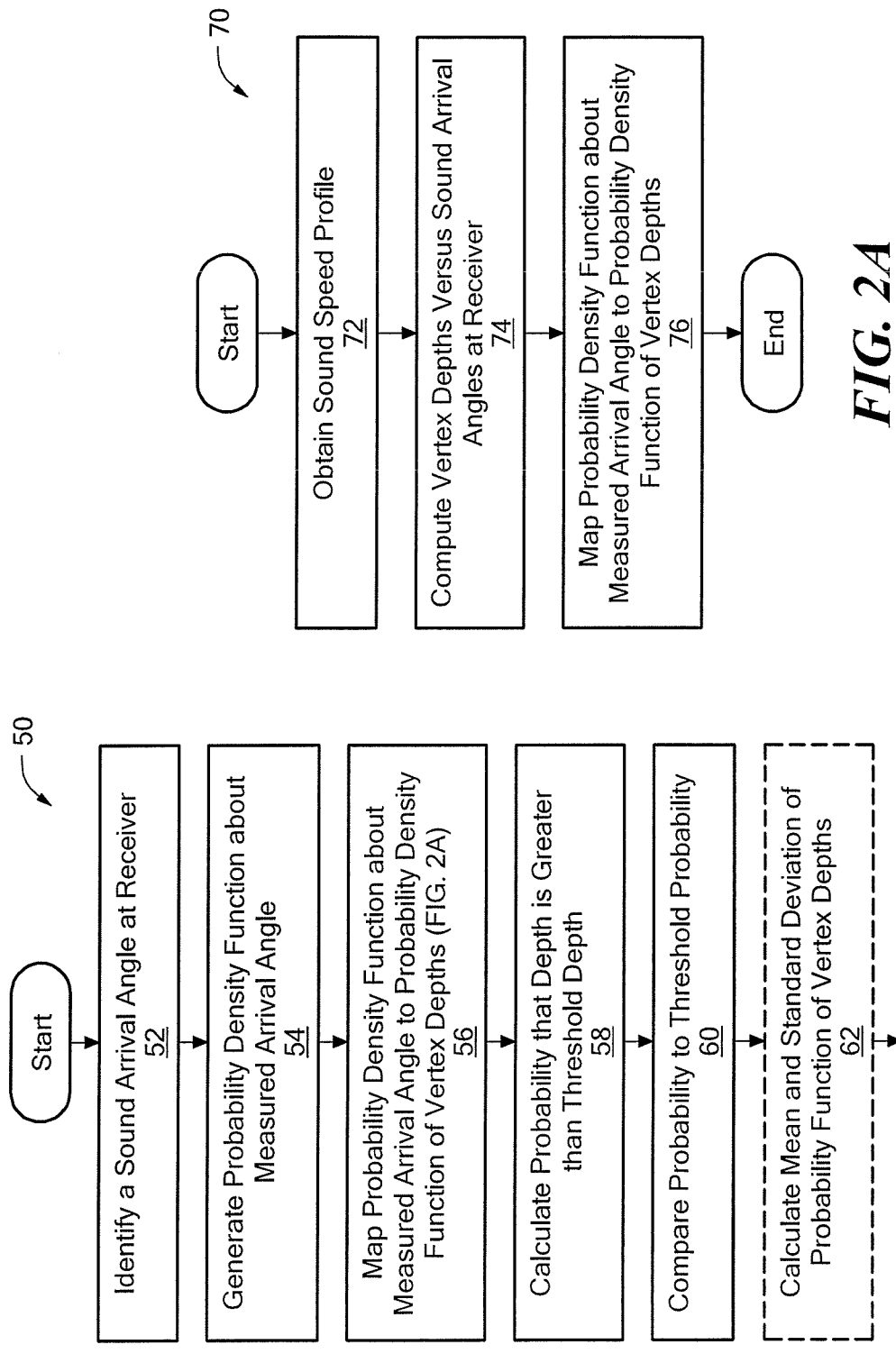
FIG. 2 is a flow chart showing a process to determine a probability that the depth of a sound source in the water is greater than a threshold depth.
Figure 9:
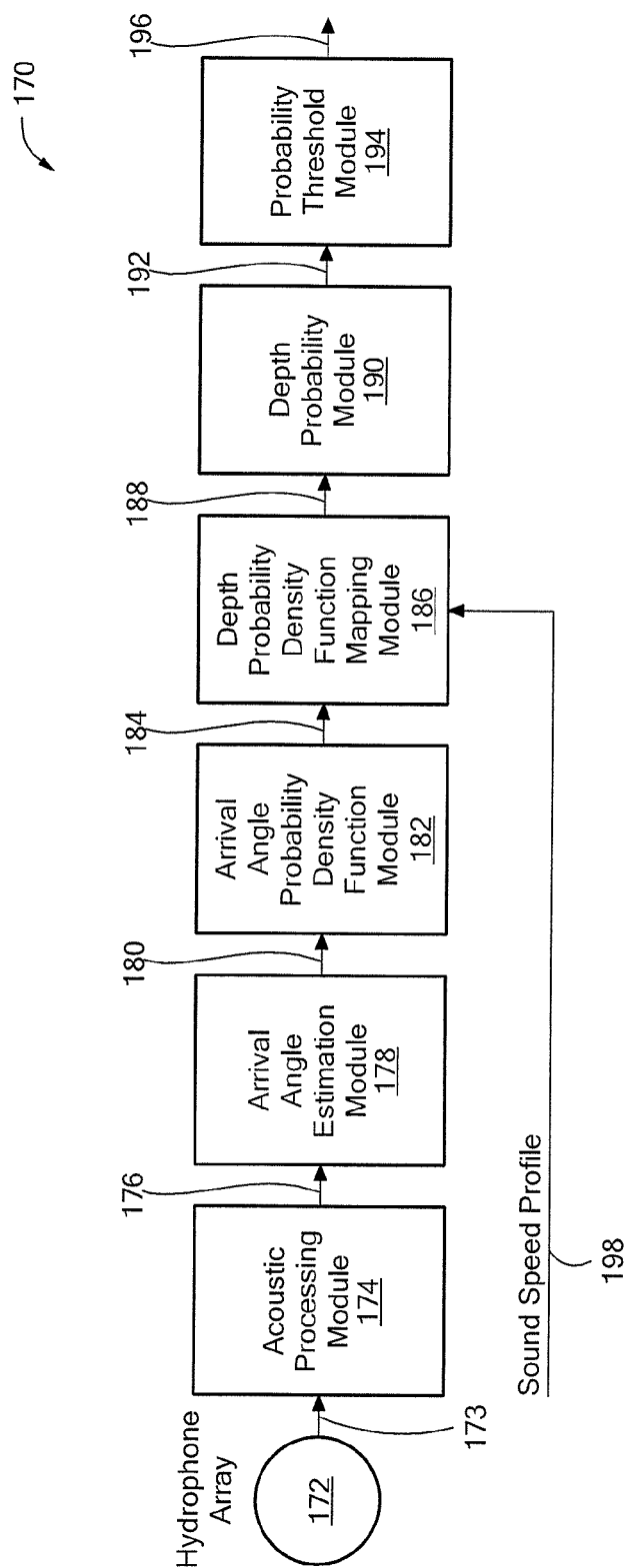
FIG. 9 is a block diagram showing a system for determining whether a target in the water is below a threshold depth.

It should be appreciated that FIGS. 2 and 2A show flowcharts corresponding to the below contemplated technique which would be implemented in computer system 170 (FIG. 9). Rectangular elements (typified by element 52 in FIG. 2), herein denoted "processing blocks," represent computer software instructions or groups of instructions. Diamond shaped elements, of which there may be none, herein denoted "decision blocks," represent computer software instructions, or groups of instructions, which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the invention. Thus, unless otherwise stated the blocks described below are unordered meaning that, when possible, the steps can be performed in any convenient or desirable order.

Referring now to FIG. 2, a method 50 for discriminating a subsurface or a surface sound-generating target in the water begins at block 52, where a sound arrival angle is identified.

Referring briefly to FIG. 1, the sound arrival angle may be identified, for example, by identifying a largest sound level in one of the beams 16a-16c. Interpolation between sound levels in the beams 16a-16c can be used to improve the estimation of sound arrival angle. A variety of other techniques can be used to identify the sound arrival angle, including, but not limited to, monopulse techniques and cross correlation techniques that will both be familiar to those of ordinary skill in the art.

Returning now to FIG. 2, at block 54, a probability density function is generated to describe probabilities that the angle of sound arrival is probabilistic about the sound arrival angle identified at block 52. One of ordinary skill in the art will be able to generate such a probability density function based upon such things as beam width (i.e., array length), acoustic and electronic noise, and signal to noise ratio. In some embodiments the probability density function generated at block 54 is assumed to be Gaussian.

At block 56, the probability density function about the measured arrival angle generated at block 54 is mapped to a different probability density function, a probability density function of vertex depths. The mapping is described more fully below in conjunction with FIGS. 2A-6. However certain relationships are given here below.

As used herein, the term "vertex depth" is used to describe a shallowest depth along a direct sound path between a target and a sound target occurs. An exemplary vertex depth 20 is shown in FIG. 1. Similarly, the term "vertex sound velocity" is used herein to describe a sound velocity that exists at the vertex depth.

Snell's law describes that the angle a ray path achieves at any depth, d, is described by the following relationship.

$$\cos(\theta d) = (Vd/Vr)\cos(\theta r),$$

where:
d=depth
Vd=sound speed at the depth, d
θd=angle of sound at the depth, d
Vr=sound speed at a sound receiver
θr=angle of sound arrival at a the sound receiver A sound path vertexes at a sound angle, θd, of zero degrees at the depth, d, i.e., a vertex depth, x, which corresponds to an angle of sound received at the receiver of $$\cos(\theta r) = Vr/Vx, \text{ and therefore,}$$

$$Vx = Vr/\cos(\theta r),$$

where:
Vx=the vertex sound velocity at the vertex depth.

From the above relationships, it will be apparent that by measuring a received sound arrival angle at a sound receiver, by knowing s sound speed at the sound receiver, and by knowing the sound speed at other depths, a depth at which Vx occurs can be determined, i.e., a vertex depth. It will also be understood that the vertex depth occurs at a minimum depth at which a sound target associated with the received sound is likely to be. Therefore, if it is found that the vertex depth is at or near the surface of the ocean, then it is likely that the received sound was generated by a surface ship. And conversely, if the vertex depth is found to be below a predetermined threshold depth, for example, sixty feet, then it is likely that the received sound was generated by a submarine.

At block 58, a calculation is made to determine a probability that the depth of the target is greater than a predetermined threshold depth. It will be understood that the probability can be calculated by integrating a portion of the probability density function generated at block 56.

At block 60, the probability calculated at block 58 can be compared to a threshold probability. For example, suppose that the threshold depth used at block 58 is sixty feet. Suppose also that the probability that the target is greater that sixty feet is calculated at block 58 to be 80%. At block 60, the probability of 80% can be compared to a predetermined threshold probability, for example 50%, to identify if the determination that the target is a submarine is sufficiently good.

In some embodiments, the probability comparison made at block 60 can be combined with other calculations. For example, in some arrangements, a blade rate of a propeller associated with the target can be detected and the blade rate can provide further evidence as to whether the target is a submarine or a surface ship. Various narrowband spectral processing techniques can also be used to assist with the identification of a submarine versus a surface ship.

At block 62, optionally, a mean and a standard deviation can be calculated for the probability density function of vertex depths mapped at block 56. This calculation can be done over a variety of potential arrival angles at the sound receiver. The means and standard deviation are described more fully below in conjunction with FIG. 7. Other forms of data graphs can also be generated.

Referring now to FIG. 2A, a process 70 can provide the block 56 of FIG. 2. The process 70 begins at block 72, at which a sound speed profile is obtained. An exemplary sound speed profile is described below in conjunction with FIG. 5. One of ordinary skill in the art will understand a sound speed profile to be either a continuous function or a set of data points that represent sounds speeds in the ocean at a plurality of depths. A sounds speed profile can be obtained from a variety of sources, including from an estimate based upon known sound speed profile tables, and direct measurements made by a bathythermograph instrument or the like.

Figure 6:
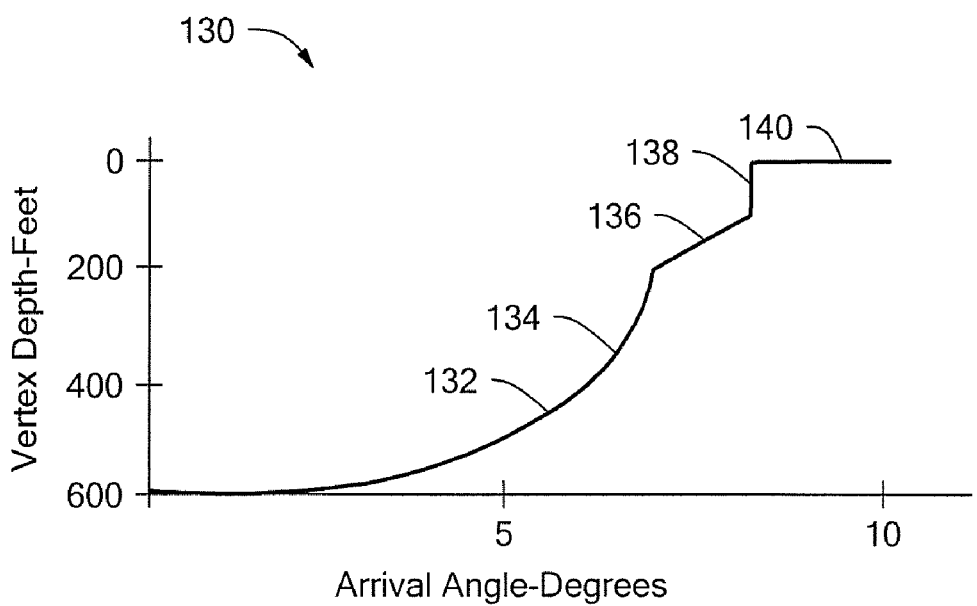
FIG. 6 is a graph showing calculated vertex depths versus arrival angles.

At block 74, a graph is generated that indicates vertex depths at a plurality of assumed arrival angles at a sound receiver, for example, the sound receiver 12 of FIG. 1. An exemplary graph of this type is shown in FIG. 6. Generation of the graph of FIG. 6 is described below in greater detail.

At block 76, using the graph indicative of vertex depths versus arrival angles generated at block 74, the probability density function about the measured arrival angle generated at block 54 of FIG. 2 is mapped to the probability density function of vertex depths as described above in conjunction with block 56 of FIG. 2. The mapping is described more fully below in conjunction with FIGS. 2A-6.

Figure 3:
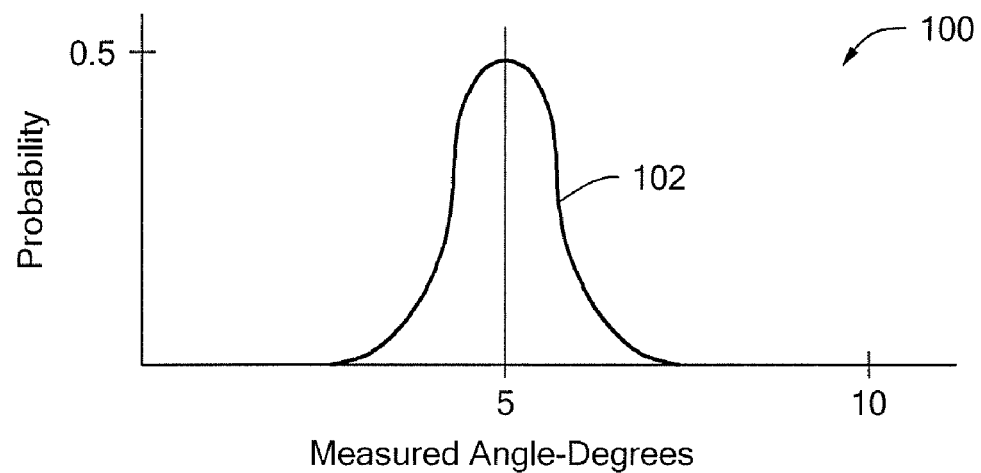
FIG. 3 is a graph showing a probability density function surrounding a measured arrival angle, measure by the sound receiver of FIG. 1.

Referring now to FIG. 3, a graph 100 includes a horizontal axis with units of measured angle in degrees as measured, for example, by the sound receiving system 2 of FIG. 1. The graph 100 also includes a vertical axis in units of probability.

The graph 100 includes a curve 102 representative of an exemplary measured sound arrival angle of five degrees. However, it will be understood that the measurement of the arrival angle is not perfect, therefore, the curve 102 can be generated to describe probabilities that the actual sound arrival angle is different than five degrees.

Referring again briefly to FIG. 1, the sound arrival angle may be identified, for example, by identifying a largest sound level in one of the beams 16a-16c. Interpolation between sound levels in the beams 16a-16c can be used to improve the estimation of sound arrival angle. A variety of other techniques can be used to identify the sound arrival angle, including, but not limited to, monopulse techniques and cross correlation techniques that will both be familiar to those of ordinary skill in the art.

Referring again to FIG. 3, one of ordinary skill in the art will be able to generate a probability density function such as the curve 102 based upon such things as beam width (i.e., array length), acoustic and electronic noise, and signal to noise ratio.

Figure 4:
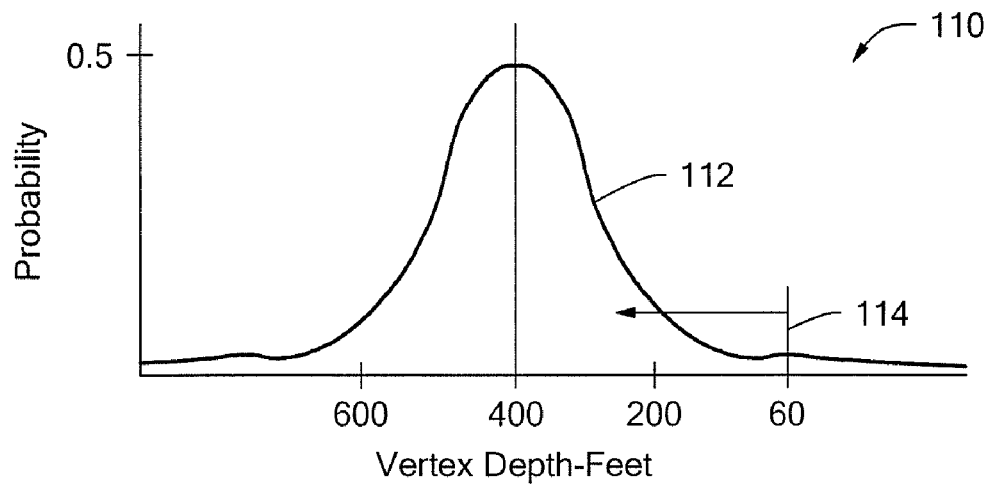
FIG. 4 is a graph showing a probability density function of vertex depths mapped from the probability density function if FIG. 3.

Referring now to FIG. 4, a graph 110 includes a horizontal axis with units of vertex depth in feet. The graph 110 also includes a vertical axis in units of probability. A curve 112 is representative of a vertex depth of about four hundred feet with a probability of about 0.5, which corresponds to the arrival angle of five degrees shown in FIG. 3 with a probability of about 0.5. The curve 112 also includes other vertex depths and associate probabilities. The curve 112 is mapped from the curve 102 of FIG. 3 by a process that is described below in conjunction with FIGS. 5 and 6.

An exemplary threshold depth 114 of sixty feet is indicated. It will be understood that integrating under the curve 112 to the left of the threshold depth 114 (i.e., block 58 of FIG. 2) results in a probability that the depth of the sound-generating target is greater than 60 feet. Therefore, the integration can yield a discrimination between a submarine and a surface ship. It will be understood that other threshold depths could be used that are greater than or less than sixty feet.

Figure 5:
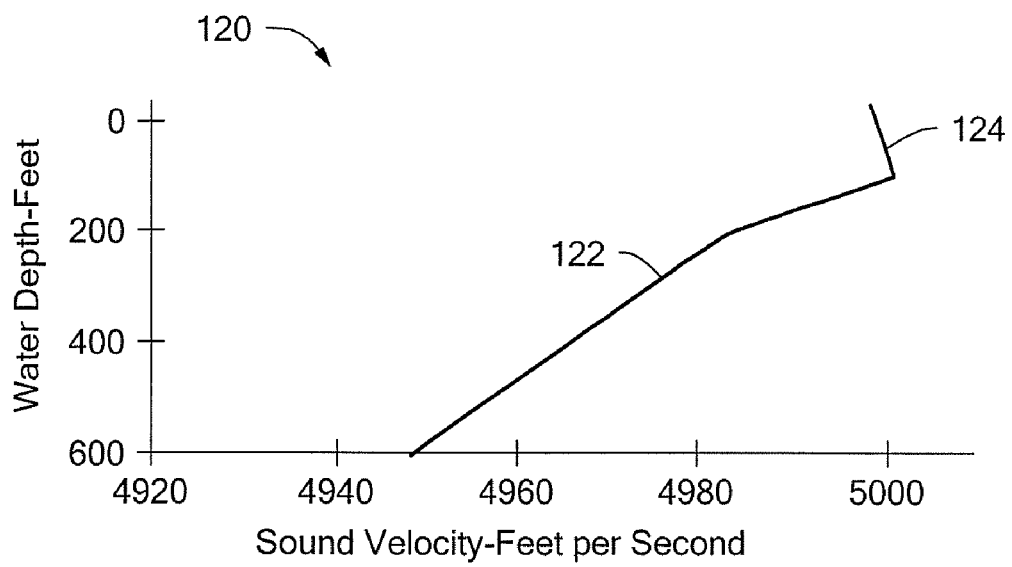
FIG. 5 is a graph showing a sound speed velocity profile versus depth.

Referring now to FIG. 5, a graph 120 includes a horizontal axis in units of sound speed in feet per second. The graph 120 also includes a vertical axis with units of water depth in feet. A curve 122 is a sound speed profile, or a graph of sound speed versus depth in the water.

Referring now to FIG. 6, a graph 130 includes a horizontal axis with units of sound arrival angle in degrees. The graph 120 also includes a vertical axis with units of vertex depth in feet. The graph 130 includes a curve 132 indicative of vertex depths associated with particular sound arrival angles. The curve 132 can be generated using the curve 122 of FIG. 5, a known receiver depth, for example, six hundred feet, and the equations listed above, in particular:

$$Vx = Vr/\cos(\theta r),$$

where:
Vr=sound speed at a sound receiver
Vx=vertex sound velocity at the vertex depth; and
θr=angle of sound arrival at a the sound receiver For example, to find one point on the curve 122, for an arrival angle, θr, of five degrees, a receiver at six hundred feet, and the sound speed profile of FIG. 5:
Vr=4948
cos(θr)=0.99619
therefore, Vx=4967 and, from FIG. 5, vertex depth=about 400 feet.

The curve 132 has regions 134, 136, 138, 140, corresponding to changes in slope of the sound speed velocity profile of FIG. 5.

It should be apparent now that in order to map the probability density function 102 of FIG. 3 to the probability density function 112 of FIG. 4, the probability density function 102 can be compared with the curve 132 of FIG. 6, and arrival angles of the curve 102 can be mapped to vertex depths of the curve 132 of FIG. 6 in order to result in the curve 112 of FIG. 4.

Figure 7:
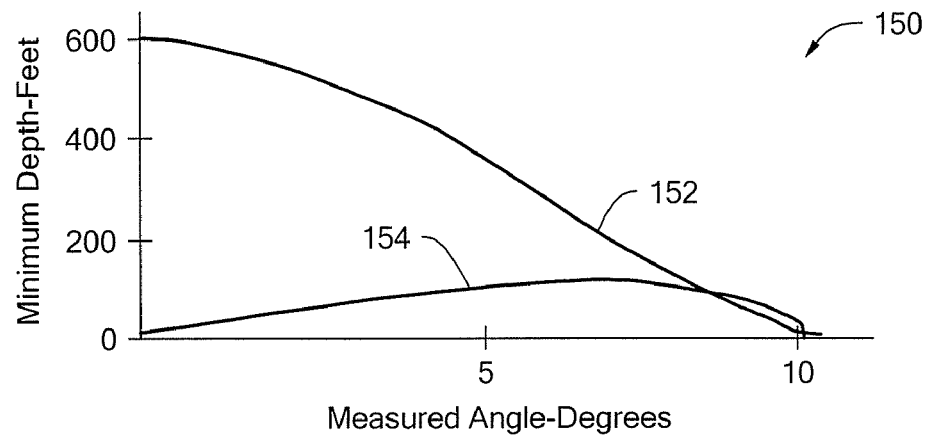
FIG. 7 is a graph showing a mean and a standard deviation of minimum depths of a sound source in the water versus measured angels.

Referring now to FIG. 7, a graph 150 includes a horizontal axis with units of measured sound arrival angle in degrees. The graph 150 also includes a vertical axis with units of minimum water depth (i.e., depth in the water) in feet. A curve 152 is representative of means and a curve 154 is representative of standard deviations over a plurality or sound arrival angles. For example, using the example of FIGS. 3 and 4, a measured angle having a mean of five degrees in FIG. 3 corresponds to a vertex depth having a mean of about of about 400 feet, which is but one point on the curve 152. Similarly, the measure angle of five degrees in the curve 102 o FIG. 3 has a standard deviation of about 2 degrees corresponding to a standard deviation in the curve 112 of FIG. 4 of about 150 feet of depth, which is but one point on the curve 154. Other points on the curves 152 and 154 can be obtained by generating curves like those of FIGS. 3 and 4, but starting with different sound arrival angles.

Figure 8:
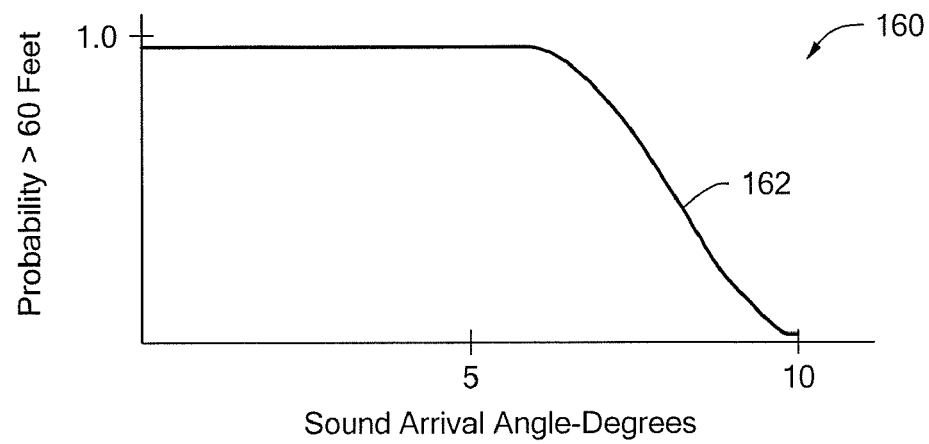
FIG. 8 is a graph showing probabilities that a sounds source in the water is greater than a threshold depth versus at various arrival angles.

Referring now to FIG. 8, a graph 160 includes a horizontal axis with units of measured sound arrival angle in degrees. The graph 160 also includes a vertical axis with units of probability that the target is at a depth greater than a predetermined threshold depth, for example, sixty feet. The graph 160 also includes a curve 162. The curve 162 can be generated by generating a number of curves like those of FIGS. 3 and 4, but at different sound arrival angles, and by integrating each of the curves thus generated as indicated above in conjunction with FIG. 4.

The curve 162 indicates that for the exemplary sound arrival of five degrees, as would be calculated by integrating in FIG. 4 to the left of the threshold depth 114 of sixty feet, the probability that the target is at a depth greater than the threshold depth (or greater than or equal to the threshold depth) is nearly 1.0.

Referring now to FIG. 9, a system 170 for discriminating a surface from a subsurface sound-generating target in the water includes a sound receiver 172 configured to receive underwater sound generated by an underwater target and configured to convert the underwater sound to a sound-related signal 173. The system 170 also includes an acoustic processing module 174 coupled to receive the sound related signal 173 and configured to generate a processed signal 176. The system 170 also includes an angle estimation module 178 coupled to receive the processed signal 176 and configured to identify an arrival angle 180 of sound generated by the sound-generating target. The system 170 also includes an arrival angle probability density function module 182 coupled to receive the coupled to receive the identified arrival angle 180 and configured to generate a probability density function 184 about the measured arrival angle having a corresponding plurality of sound arrival angles. The system 170 also includes a depth probability density function module 186 configured to map the probability density function 184 about the measured arrival angle to a probability density function of vertex depths 188. The system 170 also includes a depth probability module 190 configured to calculate a probability 192 that the depth of the sound-generating target is greater than a threshold depth by integrating the probability density function 188 of vertex depth. In some embodiments, the system 170 also includes a probability threshold module 194 configured to compare the probability 192 to a threshold probability and configured to generate a decision signal 196 indicative of whether the sound received by the sound receiver 172 was generated by a submarine or by a surface ship.

The system 170 can be embodied in a computer system and the elements of the system 170 can be embodied in a computer-readable storage medium having computer readable code thereon with instructions for doing the functions described in conjunction with FIGS. 2-8.

Elements identified as modules in FIG. 9 can be embodied as groups of software instructions or alternately as computer processors or portions of a single computer processor.

Having described preferred embodiments of the invention it will now become apparent to those of ordinary skill in the art that other embodiments incorporating these concepts may be used. Additionally, the software included as part of the invention may be embodied in a computer program product that includes a computer readable storage medium. For example, such a computer readable storage medium can include a readable memory device, such as a hard drive device, a CD-ROM, a DVD-ROM, or a computer diskette, having computer readable program code segments stored thereon. A computer readable transmission medium can include a communications link, either optical, wired, or wireless, having program code segments carried thereon as digital or analog signals. Accordingly, it is submitted that that the invention should not be limited to the described embodiments but rather should be limited only by the spirit and scope of the appended claims. All publications and references cited herein are expressly incorporated herein by reference in their entirety.

What is claimed is:

1. A computer-implemented method of discriminating a subsurface from a surface sound-generating target in the water, comprising:
    receiving sound generated by the sound-generating target with a sound receiver at a known depth in the water;
    identifying an arrival angle of the sound generated by the sound-generating target;
    generating a probability density function about the measured arrival angle having a corresponding plurality of sound arrival angles;
    mapping the probability density function about the measured arrival angle to a probability density function of vertex depths; and
    calculating a probability that the depth of the sound-generating target is greater than a threshold depth by integrating the probability density function of vertex depths, wherein the identifying the generating the mapping, and the calculating are performed by one or more processors.

2. The computer-implemented method of claim 1, wherein the mapping comprises:
    obtaining a sound speed profile versus depth;
    computing a corresponding plurality of vertex depths at the plurality of sound arrival angles; and
    mapping the probability density function about the measured arrival angle to the plurality of vertex depths at the plurality of sound arrival angles.

3. The computer-implemented method of claim 2, wherein the computing the plurality of vertex depths at the plurality of sound arrival angles comprises:
    computing a corresponding plurality of vertex sound speed velocities; and
    comparing the plurality of vertex sound speed velocities to the sound speed profile.

4. The computer-implemented method of claim 3, wherein the computing the plurality of vertex sound speed velocities at the plurality of sound arrival angles comprises:
    computing the plurality of vertex sound speed velocities by a relationship $Vx=Vo/\cos(\theta o)$, where $Vx$=a vertex sound speed velocity, $Vo$=sound speed velocity at a depth of the sound receiver, and $\theta o$=an angle of sound arrival at the sound receiver.

5. The computer-implemented method of claim 1, further comprising:
    comparing the probability to a threshold probability.

6. The computer-implemented method of claim 1, further comprising:
    computing a plurality of probabilities that the depth of the sound-generating target is greater than the threshold depth for a corresponding plurality of sound arrival angles.

7. The computer-implemented method of claim 1, further comprising:
    computing a mean of the probability density function of vertex depth.

8. The computer-implemented method of claim 1, further comprising:
    computing a standard deviation of the probability density function of vertex depth.

9. A non-transitory computer-readable storage medium having computer readable code thereon for discriminating a subsurface from a surface sound-generating target in the water, comprising instructions for:
    identifying an arrival angle of sound generated by the sound-generating target and received by a sound receiver at a known depth in the water;
    generating a probability density function about the measured arrival angle having a corresponding plurality sound arrival angles;
    mapping the probability density function about the measured arrival angle to a probability density function of vertex depths; and
    calculating a probability that the depth of the sound-generating target is greater than a threshold depth by integrating the probability density function of vertex depth.

10. The non-transitory computer-readable storage medium of claim 9, wherein the instructions for mapping comprise instructions for:

obtaining a sound speed profile versus depth;

computing a corresponding plurality of vertex depths at the plurality of sound arrival angles; and mapping the probability density function about the measured arrival angle to the plurality of vertex depths at the plurality of sound arrival angles.

11. The non-transitory computer-readable storage medium of claim 10, wherein the instructions for computing the plurality of vertex depths at the plurality of sound arrival angles comprise instructions for:

computing a corresponding plurality of vertex sound speed velocities; and comparing the plurality of vertex sound speed velocities to the sound speed profile.

12. The non-transitory computer-readable storage medium of claim 11, wherein the computing the plurality of vertex sound speed velocities at the plurality of sound arrival angles comprise instructions for:

computing the plurality of vertex sound speed velocities by a relationship $Vx=Vo/\cos(\theta o)$, where $Vx$=a vertex sound speed velocity, $Vo$=sound speed velocity at a depth of the sound receiver, and $\theta o$=an angle of sound arrival at the sound receiver.

13. The non-transitory computer-readable storage medium of claim 9, further comprising instructions for:

comparing the probability to a threshold probability.

14. The non-transitory computer-readable storage medium of claim 9, further comprising instructions for:

computing a plurality of probabilities that the depth of the sound-generating target is greater than the threshold depth for a corresponding plurality of sound arrival angles.

15. The non-transitory computer-readable storage medium of claim 9, further comprising instructions for:

computing a mean of the probability density function of vertex depth.

16. The non-transitory computer-readable storage medium of claim 9, further comprising instructions for:

computing a standard deviation of the probability density function of vertex depth.

17. A system for discriminating a subsurface from a surface sound-generating target in the water, comprising:

a sound receiver configured to receive underwater sound generated by the sound-generating target and configured to convert the underwater sound to a sound-related signal;

an acoustic processing module coupled to receive the sound-related signal and configured to generate a beamformed signal;

an angle estimation module coupled to receive the beamformed signal and configured to identify an arrival angle of sound generated by the sound-generating target;

an arrival angle probability density function module coupled to receive the identified arrival angle and configured to generate a probability density function about the measured arrival angle having a corresponding plurality of sound arrival angles;

a depth probability density function module configured to map the probability density function about the measured arrival angle to a probability density function of vertex depths; and a depth probability module configured to calculate a probability that the depth of the sound-generating target is greater than a threshold depth by integrating the probability density function of vertex depths.

18. The system of claim 17, wherein, in order to map the probability density function, the depth probability module is further configured to:

obtain a sound speed profile versus depth;

compute a corresponding plurality of vertex depths at the plurality of sound arrival angles; and map the probability density function about the measured arrival angle to the plurality of vertex depths at the plurality of sound arrival angles.

19. The system of claim 18, wherein, in order to compute the plurality of vertex depths at the plurality of sound arrival angles, the depth probability module is further configured to:

compute a corresponding plurality of vertex sound speed velocities; and compare the plurality of vertex sound speed velocities to the sound speed profile.

20. The system of claim 17, further comprising:

a probability threshold module configured to compare the probability to a threshold probability.

* * * * *